United States Patent [19]

Phoy

[11] Patent Number: 5,394,400
[45] Date of Patent: Feb. 28, 1995

[54] MULTIADDRESS REMOTE CONTROL OF VEHICULAR ACCESSORIES WITHOUT MICROPROCESSORS

[75] Inventor: Chamroeun Phoy, Glendale Hts., Ill.

[73] Assignee: Eaton Corporation, Cleveland, Ohio

[21] Appl. No.: 80,164

[22] Filed: Jun. 21, 1993

[51] Int. Cl.⁶ .............................................. H04L 12/40
[52] U.S. Cl. .................................... 370/85.1; 370/92; 340/825.52
[58] Field of Search .................... 370/85.1-3, 370/67, 92, 93; 340/825.5, 825.52, 825.08, 825.56, 426, 425.5, 531; 307/10.1

[56] References Cited

U.S. PATENT DOCUMENTS

| | | | |
|---|---|---|---|
| 3,814,861 | 6/1974 | Robbins | 370/92 |
| 3,864,578 | 2/1975 | Lackey | 307/10.1 |
| 4,156,866 | 5/1979 | Miller | 340/825.52 |
| 4,200,862 | 4/1980 | Campbell et al. | 340/825.52 |
| 4,293,947 | 10/1981 | Brittain | 370/85.1 |
| 4,578,591 | 3/1986 | Floyd et al. | 370/92 |
| 4,733,215 | 3/1988 | Memmola | 340/531 |
| 4,893,334 | 1/1990 | Pernello | 379/157 |
| 5,237,264 | 8/1993 | Moseley et al. | 323/324 |

Primary Examiner—Douglas W. Olms
Assistant Examiner—Chau T. Nguyen
Attorney, Agent, or Firm—C. H. Grace; R. A. Johnston

[57] ABSTRACT

A multiaddress control system for remotely controlling accessories in a vehicle utilizes a simple encoder and decoders to perform functions previously performed by microprocessors and bus drivers. A transmitter station has an encoder for station addresses and commands that are received from manual switches. The addresses and commands are sent to all of the receiver stations simultaneously on a two-wire common signal bus. The receiver that has been addressed accepts the command and acts upon it. Every word is transmitted twice, and the receivers compare the two transmitted words. Only if the words match does an addressed receiver carry out the command.

3 Claims, 16 Drawing Sheets

MULTIADDRESS CONTROL PROTOCOL-947 (MMP-947)

| TRANSMITTER ADDRESS 74 | | | | | DATA 75 | | | | | RECEIVER ADDRESS 76 | | | | | RECEIVER LOCATION 77 |
|---|---|---|---|---|---|---|---|---|---|---|---|---|---|---|---|
| A1 | A2 | A3 | A4 | A5 | D6 | D7 | D8 | D9 | | A1 | A2 | A3 | A4 | A5 | |
| 0 | 0 | 0 | 0 | 0 | | | | | | 0 | 0 | 0 | 0 | 0 | IDLE |
| 0 | 0 | 0 | 0 | 0 | X | X | X | X | | 0 | 0 | 0 | 0 | 0 | DOOR-LEFT/FRONT* |
| 0 | 0 | 0 | 0 | 0 | X | X | X | X | | 0 | 0 | 1 | 0 | 0 | DOOR-RIGHT/FRONT |
| 0 | 0 | 0 | 1 | 0 | X | X | X | X | | 0 | 1 | 0 | 0 | 0 | DOOR-LEFT/REAR |
| 0 | 0 | 0 | 1 | 0 | X | X | X | X | | 0 | 1 | 1 | 0 | 0 | DOOR-RIGHT/REAR |
| 0 | 1 | 0 | 0 | 0 | X | X | X | X | | 0 | 0 | 0 | 1 | 0 | DOOR-LEFT/FRONT* |
| 0 | 1 | 0 | 1 | 0 | X | X | X | X | | 0 | 0 | 1 | 1 | 0 | DOOR-RIGHT/FRONT |
| 0 | 0 | 1 | 0 | H | X | X | X | X | | 0 | 1 | 0 | 1 | 0 | DOOR-LEFT/REAR |
| 0 | 1 | 0 | H | 0 | X | X | X | X | | 0 | 1 | 1 | 1 | 0 | DOOR-RIGHT/REAR |
| 0 | H | H | H | 0 | X | X | X | X | | 0 | 0 | 0 | 0 | 0 | DOOR-LEFT/FRONT* |
| | | | | | | | | | | 0 | 0 | 1 | 0 | 0 | DOOR-RIGHT/FRONT |
| | | | | | | | | | | 0 | 1 | 0 | 0 | 0 | DOOR-LEFT/REAR |
| | | | | | | | | | | 0 | 1 | 1 | 0 | 0 | DOOR-RIGHT/REAR |

H - HIGH IMPEDANCE.    X - DON'T CARE.    *IF RECEIVER IS NEEDED.

FIG. 5A

MULTIADDRESS CONTROL PROTOCOL-947 (MMP-947)

| RECEIVER LOCATION 78 | ADDRESS 79 | | | | | DATA 80 | | | | FUNCTION 81 |
|---|---|---|---|---|---|---|---|---|---|---|
| | A1 | A2 | A3 | A4 | A5 | D6 | D7 | D8 | D9 | |
| IDLE | 0 | 0 | 0 | 0 | 0 | X | X | X | X | IDLE |
| DOOR-LEFT/FRONT* | 0 | 0 | 0 | 0 | 0 | X | X | 0 | 1 | WINDOW UP |
| | | | | | | X | X | 0 | 0 | WINDOW DOWN |
| | | | | | | 0 | 1 | X | X | DOOR UNLOCK |
| | | | | | | 1 | 0 | X | X | DOOR LOCK |
| DOOR-RIGHT/FRONT | 0 | 0 | 1 | 1 | 0 | X | X | 0 | 1 | WINDOW UP |
| | | | | | | X | X | 1 | 0 | WINDOW DOWN |
| | | | | | | 0 | 1 | X | X | DOOR UNLOCK |
| | | | | | | 1 | 0 | X | X | DOOR LOCK |
| DOOR-LEFT/REAR | 0 | 1 | 0 | 0 | 0 | X | X | 0 | 1 | WINDOW UP |
| | | | | | | X | X | 1 | 0 | WINDOW DOWN |
| | | | | | | 0 | 1 | X | X | DOOR UNLOCK |
| | | | | | | 1 | 0 | X | X | DOOR LOCK |
| DOOR-RIGHT/REAR | 0 | 1 | 0 | 1 | 0 | X | X | 0 | 1 | WINDOW UP |
| | | | | | | X | X | 1 | 0 | WINDOW DOWN |
| | | | | | | 0 | 1 | X | X | DOOR UNLOCK |
| | | | | | | 1 | 0 | X | X | DOOR LOCK |

\* IF RECEIVER IS NEEDED.   X - DON'T CARE.

FIG. 5B

MULTIADDRESS CONTROL PROTOCOL-959 (MMP-959)

| TRANSMITTER ADDRESS 130 | | | | DATA 132 | | | | | | | RECEIVER ADDRESS 134 | | | | RECEIVER LOCATION 136 |
|---|---|---|---|---|---|---|---|---|---|---|---|---|---|---|---|
| A1 | A2 | A3 | A4 | D5 | D6 | D7 | D8 | D9 | | | A1 | A2 | A3 | A4 | |
| 0 | 0 | 0 | 0 | | | | | | | | 0 | 0 | 0 | 0 | IDLE |
| 0 | 0 | 0 | 0 | X | X | X | X | X | | | 0 | 0 | 0 | 1 | DOOR-LEFT/FRONT* |
| 0 | 0 | 0 | 1 | X | X | X | X | X | | | 0 | 0 | 1 | 0 | DOOR-RIGHT/FRONT |
| 0 | 0 | 1 | 0 | X | X | X | X | X | | | 0 | 0 | 1 | 1 | DOOR-LEFT/REAR |
| 0 | 0 | 1 | 1 | X | X | X | X | X | | | 0 | 1 | 0 | 0 | DOOR-RIGHT/REAR |
| 0 | 0 | 1 | H | X | X | X | X | X | | | 0 | 1 | 0 | 1 | DOOR-LEFT/FRONT* |
| 0 | 1 | 0 | H | X | X | X | X | X | | | 0 | 1 | 1 | 0 | DOOR-RIGHT/FRONT |
| 0 | 1 | 0 | H | X | X | X | X | X | | | 0 | 1 | 1 | 1 | DOOR-LEFT/REAR |
| 0 | H | H | H | X | X | X | X | X | | | 0 | 0 | 0 | 1 | DOOR-LEFT/FRONT* |
| | | | | | | | | | | | 0 | 0 | 1 | 1 | DOOR-RIGHT/FRONT |
| | | | | | | | | | | | 0 | 1 | 0 | 1 | DOOR-LEFT/REAR |
| 1 | 0 | 1 | 0 | X | X | X | X | X | | | 0 | 1 | 1 | 1 | DOOR-RIGHT/REAR |
| | | | | | | | | | | | 1 | 0 | 0 | 0 | SEAT-LEFT/FRONT |

| H-HIGH IMPEDANCE. | X-DON'T CARE. | | *IF RECEIVER IS NEEDED. |
|---|---|---|---|

FIG. 15A

MULTIADDRESS CONTROL PROTOCOL-959 (MMP-959)

| RECEIVER LOCATION 138 | ADDRESS 140 | | | | DATA 142 | | | | | | FUNCTION 144 |
|---|---|---|---|---|---|---|---|---|---|---|---|
| | A1 | A2 | A3 | A4 | D5 | D6 | D7 | D8 | D9 | | |
| IDLE | 0 | 0 | 0 | 0 | X | X | X | X | X | | IDLE |
| DOOR-LEFT FRONT* | 0 | 0 | 0 | 1 | O | O | O | O | — | | WINDOW UP |
| | | | | | O | X | X | O | O | | WINDOW DOWN |
| | | | | | O | O | — | X | X | | DOOR UNLOCK |
| | | | | | O | X | O | X | X | | DOOR LOCK |
| | | | | | — | X | O | O | — | | MIRROR TILT UP |
| | | | | | — | O | X | X | O | | MIRROR TILT DOWN |
| | | | | | — | X | O | X | X | | MIRROR TILT OUT |
| | | | | | — | O | X | X | X | | MIRROR TILT IN |
| DOOR-RIGHT/FRONT | 0 | 0 | 1 | 1 | O | X | O | O | — | | WINDOW UP |
| | | | | | O | X | X | O | O | | WINDOW DOWN |
| | | | | | O | O | — | X | X | | DOOR UNLOCK |
| | | | | | O | X | O | X | X | | DOOR LOCK |
| | | | | | — | X | O | O | — | | MIRROR TILT UP |
| | | | | | — | O | X | X | O | | MIRROR TILT DOWN |
| | | | | | — | X | O | X | X | | MIRROR TILT OUT |
| | | | | | — | O | X | X | X | | MIRROR TILT IN |
| DOOR-LEFT/REAR | 0 | 1 | 0 | 0 | O | X | O | O | — | | WINDOW UP |
| | | | | | O | X | X | O | O | | WINDOW DOWN |
| | | | | | O | O | — | X | X | | DOOR UNLOCK |
| | | | | | O | X | O | X | X | | DOOR LOCK |
| DOOR-RIGHT REAR | 1 | 0 | 1 | 0 | O | X | O | O | — | | WINDOW UP |
| | | | | | O | X | X | O | O | | WINDOW DOWN |
| | | | | | O | O | — | X | X | | DOOR UNLOCK |
| | | | | | O | X | O | X | X | | DOOR LOCK |
| SEAT-LEFT/FRONT | 1 | 0 | 1 | 0 | O | X | X | O | — | | SEAT FRONT UP |
| | | | | | O | X | X | O | O | | SEAT FRONT DOWN |
| | | | | | O | O | — | X | X | | SEAT REAR UP |
| | | | | | O | X | O | X | X | | SEAT REAR DOWN |
| | | | | | — | X | O | O | — | | SEAT FORWARD |
| | | | | | — | X | X | O | O | | SEAT BACKWARD |
| | | | | | — | O | — | X | X | | SEAT INCLINE |
| | | | | | — | O | X | X | X | | SEAT RECLINE |
| *IF RECEIVER IS NEEDED. | | | | | X-DON'T CARE. | | | | | | |

FIG. 15B

MULTIADDRESS REMOTE CONTROL OF VEHICULAR ACCESSORIES WITHOUT MICROPROCESSORS

FIELD

The invention relates to systems for controlling accessories such as door locks and window lifts in vehicles, and relates in particular to reducing the number of electric wires or optical fibers that are required for controlling the accessories remotely.

BACKGROUND

Some control systems of the prior art utilize separate microprocessors and bus drivers at the driver's door and at each of the right front, left rear, and right rear passenger positions, as well as a microprocessor under the dashboard. Usually only two common-bus conductors need be provided to each station. Both the microprocessors and the bus drivers for such systems are expensive and relatively bulky. The mean time between failure of the systems is greater because they have so many components.

SUMMARY OF THE INVENTION

The present invention simplifies vehicular remote control, systems for accessories by substituting encoders and decoders to perform the functions previously performed by microprocessors and bus drivers. The invention applies to systems requiring only one-way communication, from a transmitter station to receiver stations. A two-wire common bus, in addition to the DC power bus, connects to all stations.

A station means a general location in the vehicle, such as the driver's position, and equipment associated with that location. The transmitter station is ordinarily the driver's station, and is capable of sole control of accessories associated with its own station and for shared control of accessories of receiver stations. A receiver station is one capable of controlling only its own accessories (at least some of which can also be controlled by the transmitter station).

One object of the invention is to provide a simple, reliable, and cost-effective remote-control system for vehicular accessories.

Another object of the invention is to provide a vehicular one-way-control communication system utilizing an encoder and decoders instead of microprocessors and bus drivers.

Another object is to provide upwardly compatible protocols to minimize hardware requirements and enable commonality of parts for various models of vehicles and accessory arrangements.

Another object is to obviate the preparation of software for variations of such vehicular accessory remote-control systems.

Another object is to provide a vehicular accessory control system in which good operation is ensured by detection and rejection of erroneous address and data signals.

Another object is to provide a vehicular accessory remote control system in which overall equipment size and cost are minimized.

BRIEF DESCRIPTION OF THE DRAWINGS

FIGS. 5A and 5B are charts of a multiaddress control protocol (MMP-947) for use in a first embodiment.

FIG. 15A and 15B are charts of a multiaddress control protocol (MMP-959) for use in the second embodiment.

DESCRIPTION OF PREFERRED EMBODIMENTS

Overview of First Embodiment

The first embodiment to be described is for use in vehicles whose remotely-controlled accessories include only power windows and power door locks. It utilizes the MMP-947 protocol (whose format has 5 bits of trinary address and 4 bits of binary data), an MC145026 encoder, and several MC145027 decoders. It is suitable for both two-door and four-door vehicles.

Figure 1:
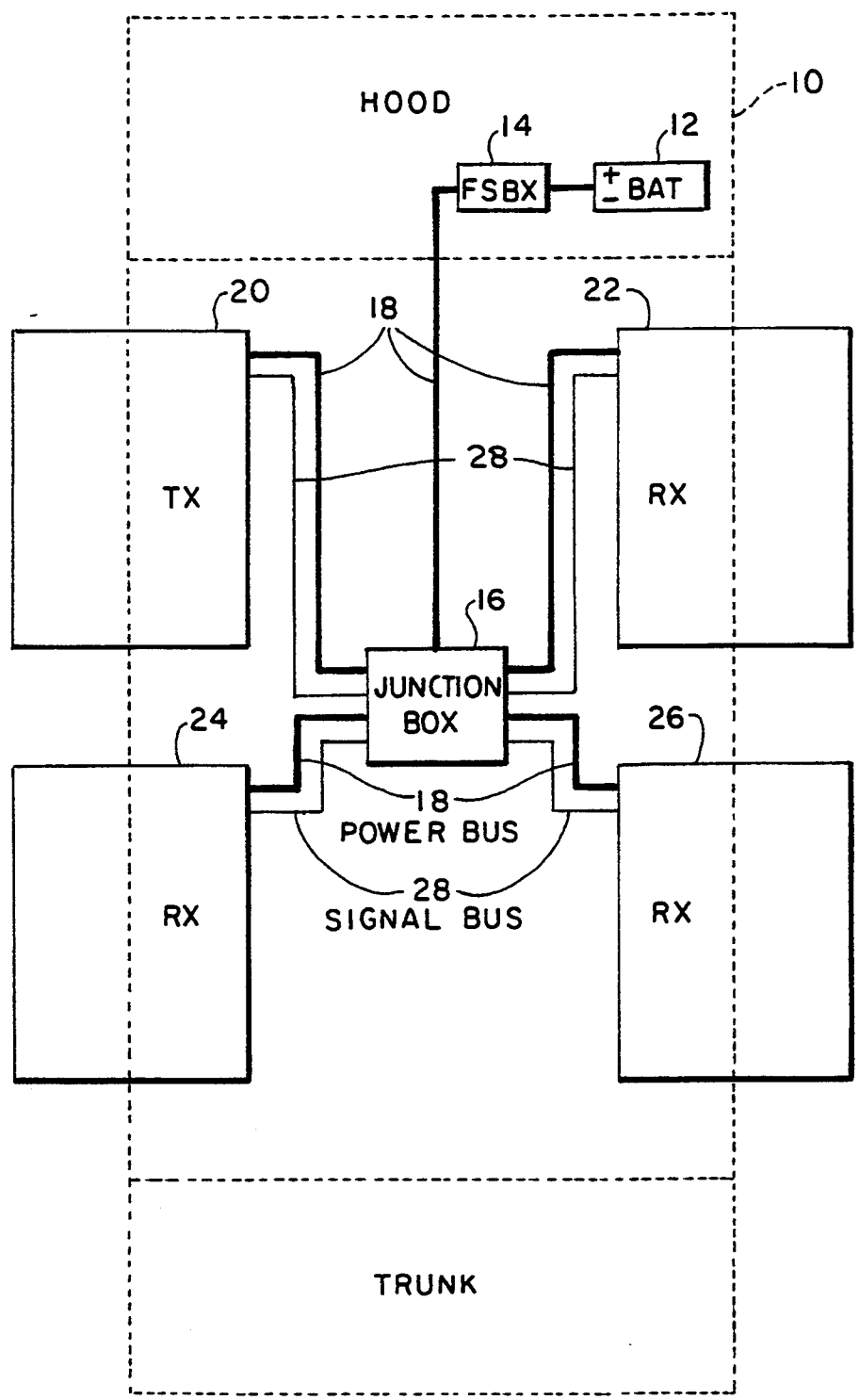
FIG. 1 is a layout of the interconnections of four stations in a vehicle.

FIG. 1 shows an automobile 10 having a battery 12 and a fuse box 14, which are interconnected to a junction box 16. A power bus network 18 provides power to a transmitter station 20 at the driver's location, a front passenger receiver station 22, and rear passenger receiver stations 24 and 26. A two-wire signal bus network 28 connects a transmitter at the transmitter station 20 to receivers at the three receiver stations 22, 24, 26 via the junction box 16.

Figure 2:
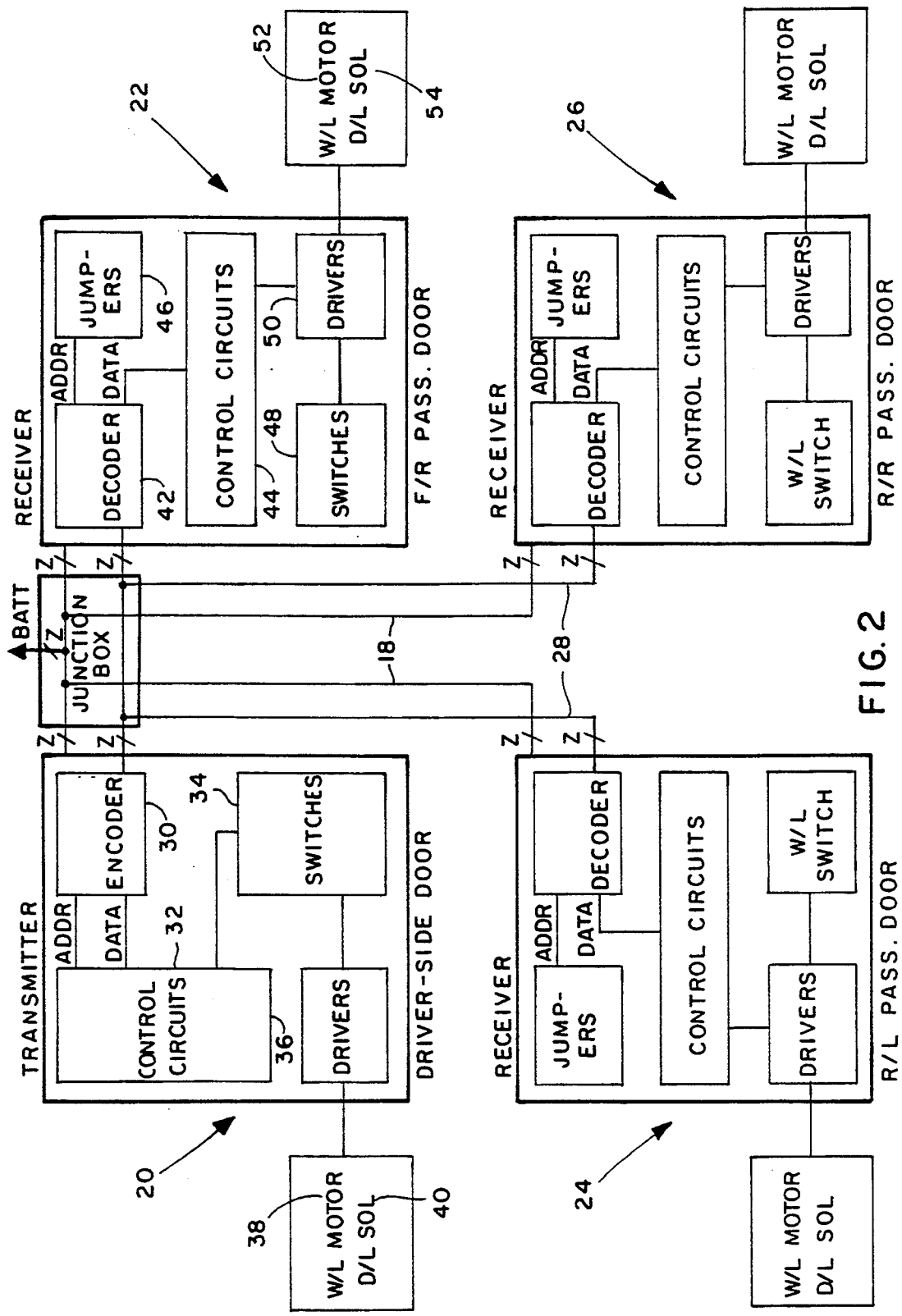
FIG. 2 is a simplified block diagram of a first embodiment of the invention.

FIG. 2 shows the transmitter-receiver multiaddress control system. The system transmits information individually to a plurality of stations by transmitting a destination identification code and associated data. The transmitter station transmits codes to all receiver stations simultaneously.

The transmitter station 20 comprises a Motorola MC145026 encoder 30, digital control circuits 32, switches 34, drivers 36, a window-lift motor 38, and a door-lock solenoid 40. The encoder 30 is a device at the transmitter station for translating an uncoded signal into a coded signal suitable for transmission on the signal bus 28 to the receiver stations.

A "first control-circuit means" 32 as the expression is used below in the claims comprises control circuits at the transmitter station for controlling a plurality of accessories associated with receiver stations. Transmitter-station manual switches 34 are manually operable control switches located at the transmitter station. Some are for control of transmitter-station accessories and some for receiver-station accessories.

Upon actuation of one of the switches at the transmitter station that is provided for control of a transmitter-station accessory, a driver in the transmitter station drives the appropriate motor without encoding. A transmitter-station driver means 36 is an interface device located at the transmitter station for powering a motor 38 (or solenoid 40) of an accessory in response to command signals.

Upon actuation of one of the switches at the transmitter station that is provided for remote control of a receiver-station accessory, the digital control circuits address the appropriate receiver station and send the command data to it.

As shown in FIG. 2 each receiver station 22, 24, 26 of the first embodiment comprises a decoder 42, digital control circuits 44, jumpers 46, manual switches 48, drivers 50, a window-lift motor 52, and a door-lock solenoid 54. Accessories associated with a receiver station, such as motor 52 and solenoid 54, are controllable at least by equipment at the respective receiver station.

The decoder 42 is a device at a receiver station for translating a coded signal into an uncoded signal. A receiver-station manual switch 48 is a manually operable switch located at a receiver station for control of only accessories at the respective receiver station. Manual operation of a switch 48 at a receiver station commands a driver to actuate the corresponding accessory locally without encoding.

The jumpers 46 serve as a switch bank at a receiver station into which are preset manually the address of the receiver station at which the jumpers are located, to assign a predetermined address to the receiver station. A remote-control-circuit means 44, as the term is used in the claims, comprises control circuits at a receiver station for controlling receiver-station accessories in response to commands that originate at transmitter-station manual switches 34.

Master Station Details

Figure 3:
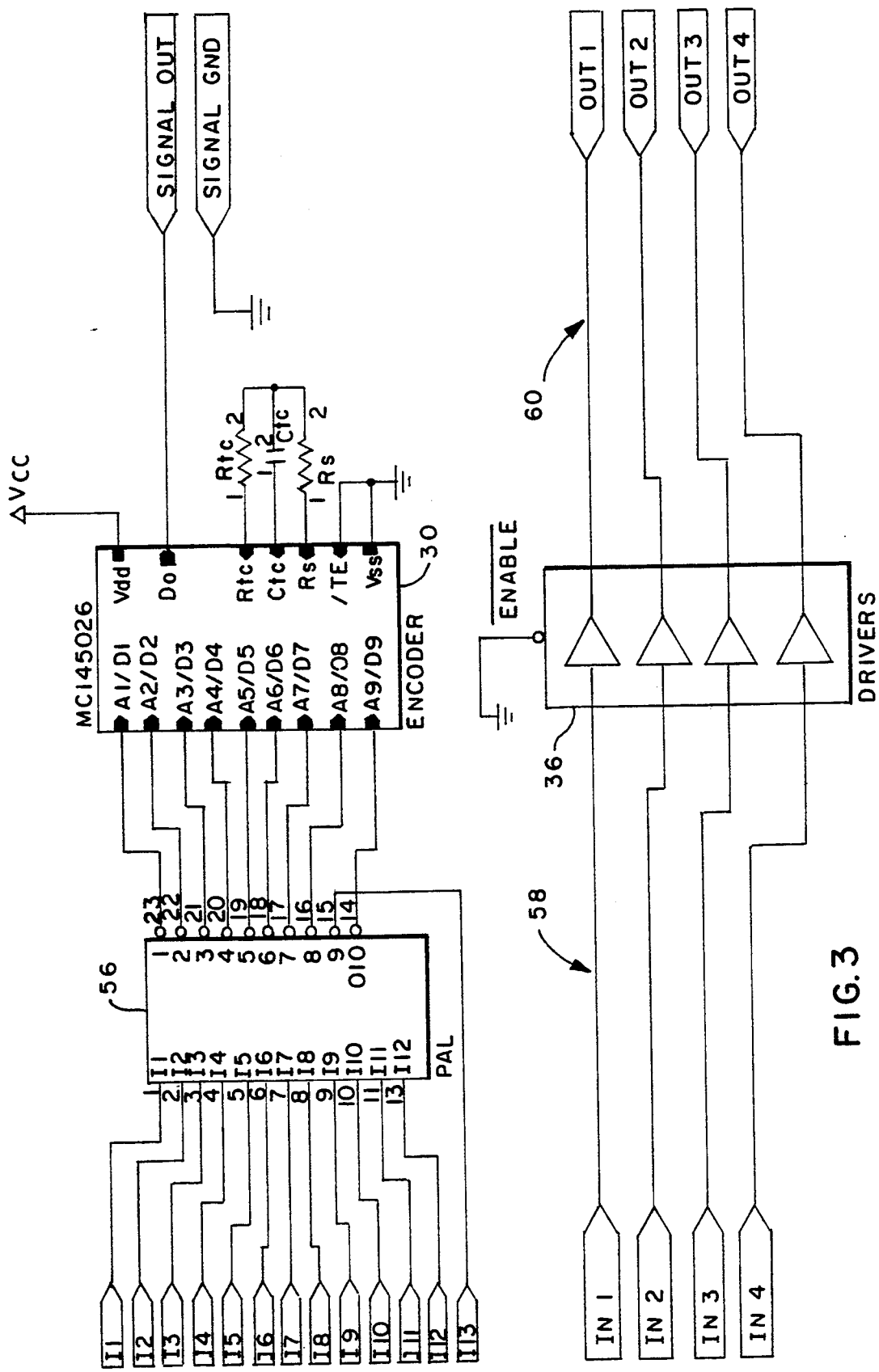
FIG. 3 is a block diagram of a portion of a transmitter located in the transmitter station of the first embodiment.
Figure 4:
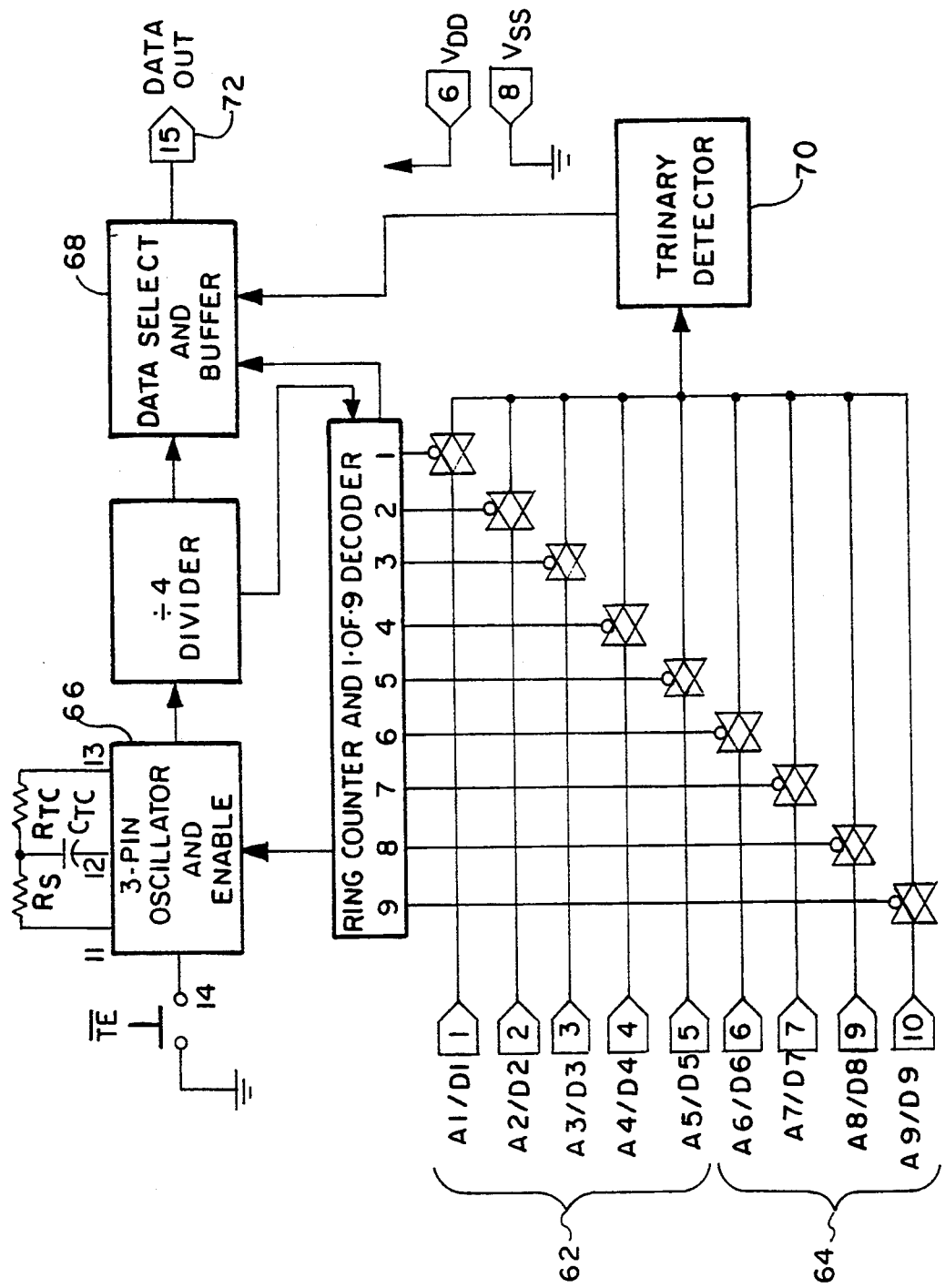
FIG. 4 is a block diagram for an encoder of type MC145026, which is used in the transmitter of both described embodiments of the invention.

A portion of the transmitter station 20 is shown in more detail in FIGS. 3 and 4. As shown in FIG. 3 the encoder 30 is a Motorola Model 145026. Inputs to the encoder 30 are received from a Programmable Array Logic (PAL) chip 56, which identifies the receiver station to which the information is to be sent. The detailed programming of the PAL is well within the capabilities of one of ordinary skill in the programming art. The driver amplifiers 36 are also shown on FIG. 3, with their inputs 58 for receiving commands from the switches 34 and outputs 60 for driving the transmitter-station loads 38 and 40. FIG. 4 shows the encoder. A group 64 of four terminals is for receiving input commands. An oscillator 66, a data selection and buffer subcircuit 68, and a trinary detector 70 encode the output data at a terminal 72 in accordance with code and waveform patterns to be described below.

In FIGS. 5A and 5B a control protocol MMP-947 is presented in chart form. The protocol is used in this embodiment only to control windows and door locks.

The first column, 74, of FIG. 5A shows the code for transmitter address. Data in the second column, 75, are independent of transmitter address 74. The third column, 76, assigns a unique five-bit address to each of the stations, to identify the intended receiver in the vehicle. The fourth column, 77, describes the locations of the various receivers corresponding to the addresses that are encoded in column 76.

In FIG. 5B, column 78 states the locations of the four receivers of the first embodiment. Column 79 gives the address of each receiver location in coded format, as set forth previously in column 76 of FIG. 5A. Column 80 shows the data for specifying instructions for the windows and door locks, such as "window up". Column 81 describes in words the action corresponding to each of the corresponding data codes of column 80.

Figure 6:
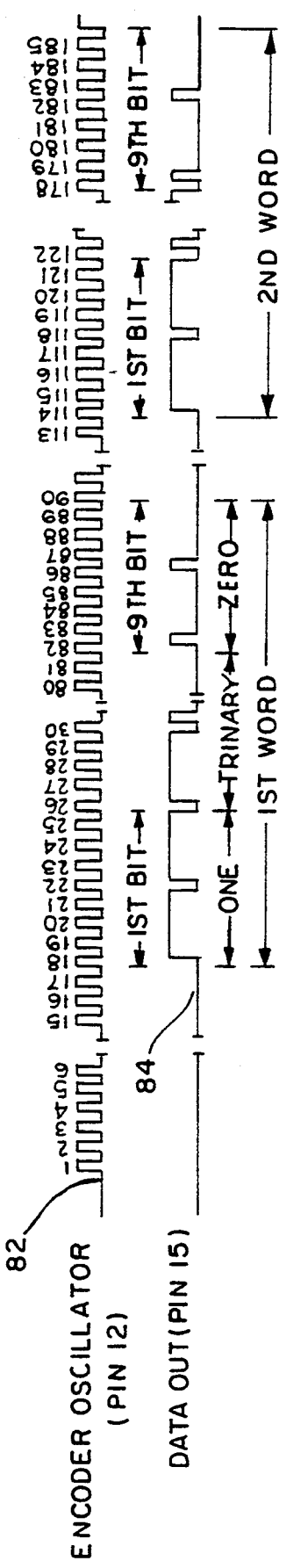
FIG. 6 is a timing diagram for the MC145026 encoder.

FIG. 6 is an encoder timing diagram. In the top row the output 82 of the encoder oscillator is depicted; in the second row a waveform 84 of two redundant successive words is shown by way of example.

Figure 7:
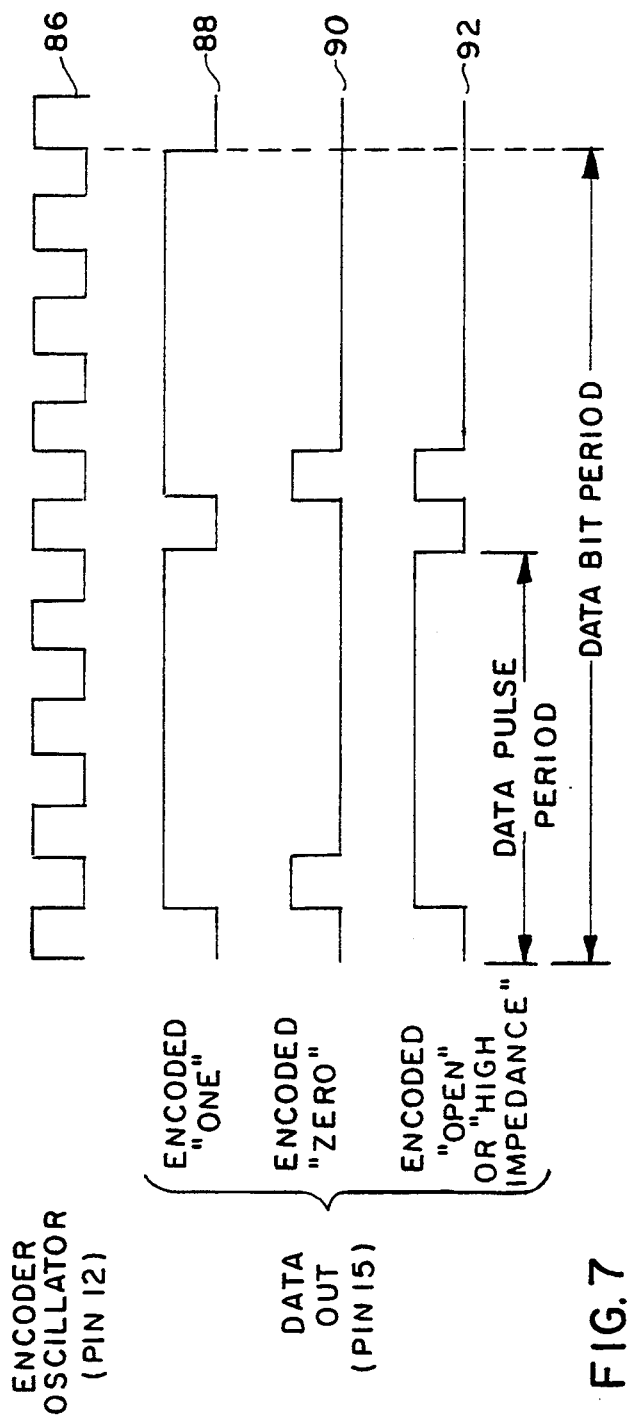
FIG. 7 shows encoded data waveforms for the MC145026 encoder.

In FIG. 7 the same waveforms are shown to a larger scale. The encoder oscillator's output is the first row, 86. An encoded data "one" is shown in row 88. An encoded "zero" is in row 90, and an encoded "open" or "high impedance" is in row 92.

Receiver Station Details

Figure 8:
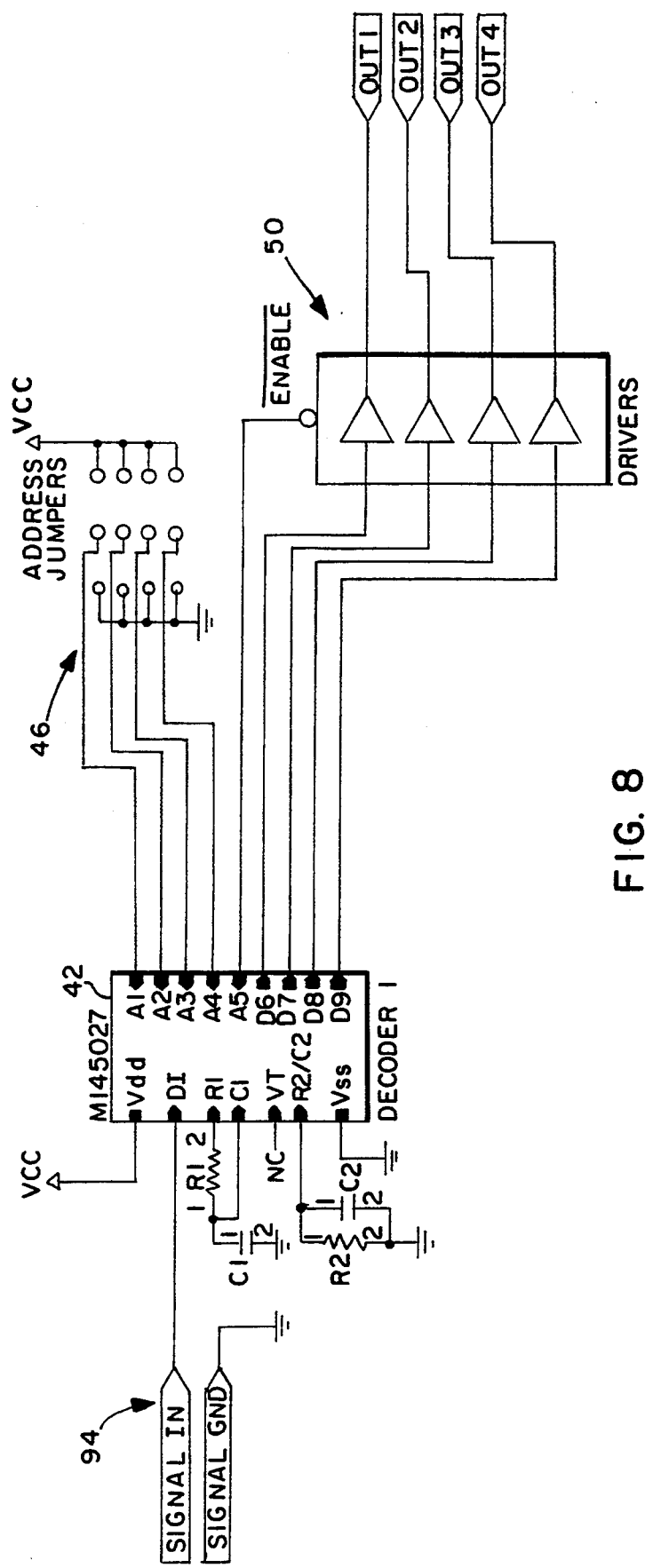
FIG. 8 is a block diagram of a portion of a receiver receiver station of the first embodiment.

FIG. 8 is a more detailed diagram of the equipment at a receiver station. Signals from the signal bus 28 enter at a header 94. The decoder 42 is a Motorola Model MC 145027. The station's address can be preset manually in the jumper array 46, and that address information is conducted to the decoder 42 at a set designated A1–A5 of five terminals of the decoder. Another set D6–D9 of four terminals of decoder 42 have connections to a set of drivers 50, which drive accessories.

Figure 9:
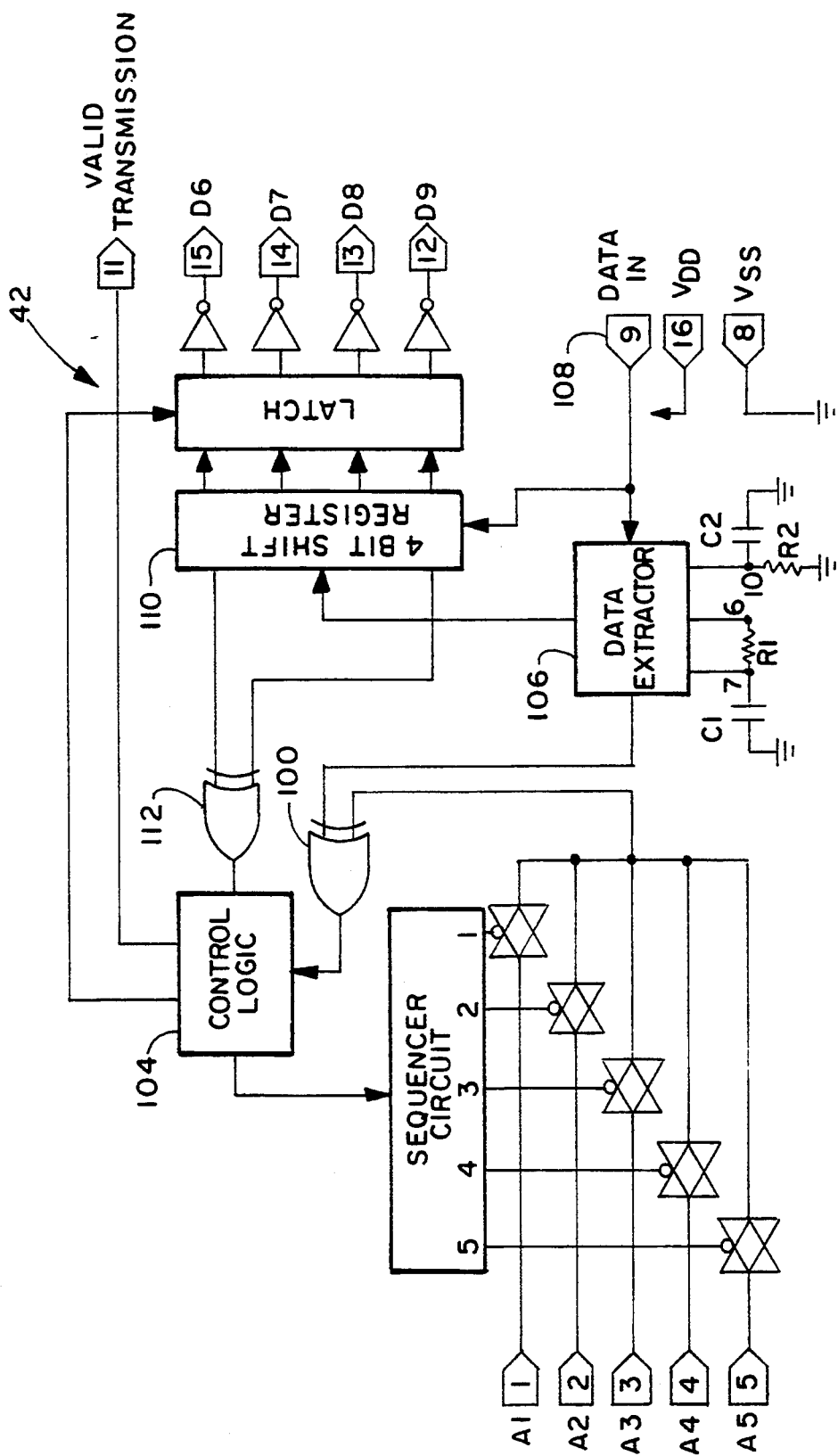
FIG. 9 is a block diagram for a type MC145027 decoder, for use in the first embodiment.

In FIG. 9, the jumper address terminals A1–A5 are shown connected within the decoder 42 to a sequencer arrangement for examining their settings and transmitting the results through an exclusive OR circuit 100 to a control logic block 104. Another input to the exclusive OR circuit 100 comes from a data extractor 106, which processes address information received on the input terminal 108 in order to compare and match addresses.

Command information received by the data extractor 106 is connected to a shift register 110, which utilizes another exclusive OR circuit 112 to detect a valid transmission. The selection of accessories takes the form of data out from the decoder 42, at terminals D6–D9 of FIG. 9.

Operation of the First Embodiment

Communication between the transmitter station's encoder and the receiver stations' decoders is performed serially via the interconnecting bus 28.

A transmission sequence is preferably initiated at the transmitter station by enabling the encoder shortly before it is to be used, for a predetermined time interval, although if desired the encoder can instead be continuously enabled. The transmitter station's encoder MC145026, a block diagram of which is shown in FIG. 4, serially transmits nine bits of trinary address and binary data in each word.

The trinary and binary code waveforms employed within each word are shown in FIG. 6. In the trinary-encoded portion, three states are available, designated as 1, 0, and "open". The "open" (high addresses both the 1 and 0 states, as shown in the protocol of FIG. 5A.

Each of the receiver stations has a unique address. Although all receiver stations received all of the transmissions from the transmitter station, only the receiver station whose address matches the transmitted address can act upon the received signal. Upon address matching, the decoder of the addressed receiver station commands an accessory-motor driver to perform a function specified by the data, as shown in the protocol of FIG. 5B.

The transmission of each word is immediately repeated, for error-detection purposes. If two redundantly transmitted words do not match, the decoder ignores the new command and continues as though the transmission did not occur. The transmitter station transmits again in the next major clock cycle. If the two words of a transmission do match, the decoder issues a "valid transmission" signal and makes use of the information received.

In a receiver station decoder MC145027 42, a block diagram of which is shown in FIG. 9, the first five bits are treated as address bits, and the last four are treated as data bits. Upon occurrence of a "valid transmission" signal the digital control circuit of the addressed receiver station drives the accessory motors according to the MMP-947 protocol of FIG. 5B.

Second Embodiment

In FIGS. 10–15B a second embodiment is shown, for use in vehicles having power seats and power mirrors as well as the above-described power windows and power door locks. The concepts employed are the same as those of the first embodiment described above, so they need not be described again in as much detail.

Figure 10:
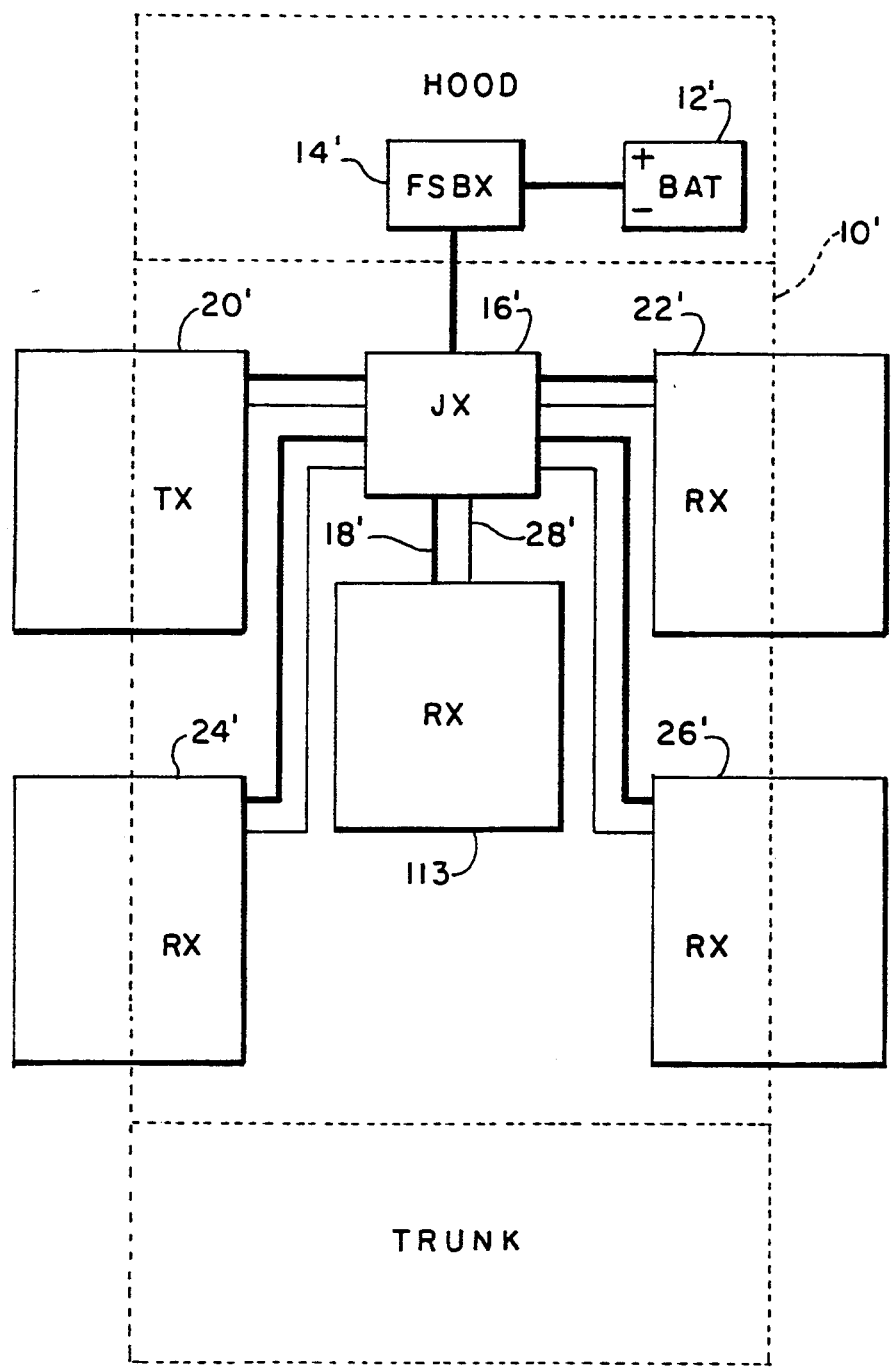
FIG. 10 is a layout of a second embodiment of the invention, showing the interconnections of five stations in a vehicle.

The second embodiment utilizes a protocol called MMP-959 (which has 4 bits of trinary address by 5 bits of binary data). It has an MC145026 and several MC145029 decoders, and is suitable for both two-door and four-door vehicles. A block diagram of the second embodiment, in FIG. 10, is similar to FIG. 1 and has in addition a receiver 113 for controlling seat motors 115. The primed reference numbers of FIG. 10 identify components that are analagous to the components identified by corresponding unprimed numbers of FIG. 1.

Figure 11:
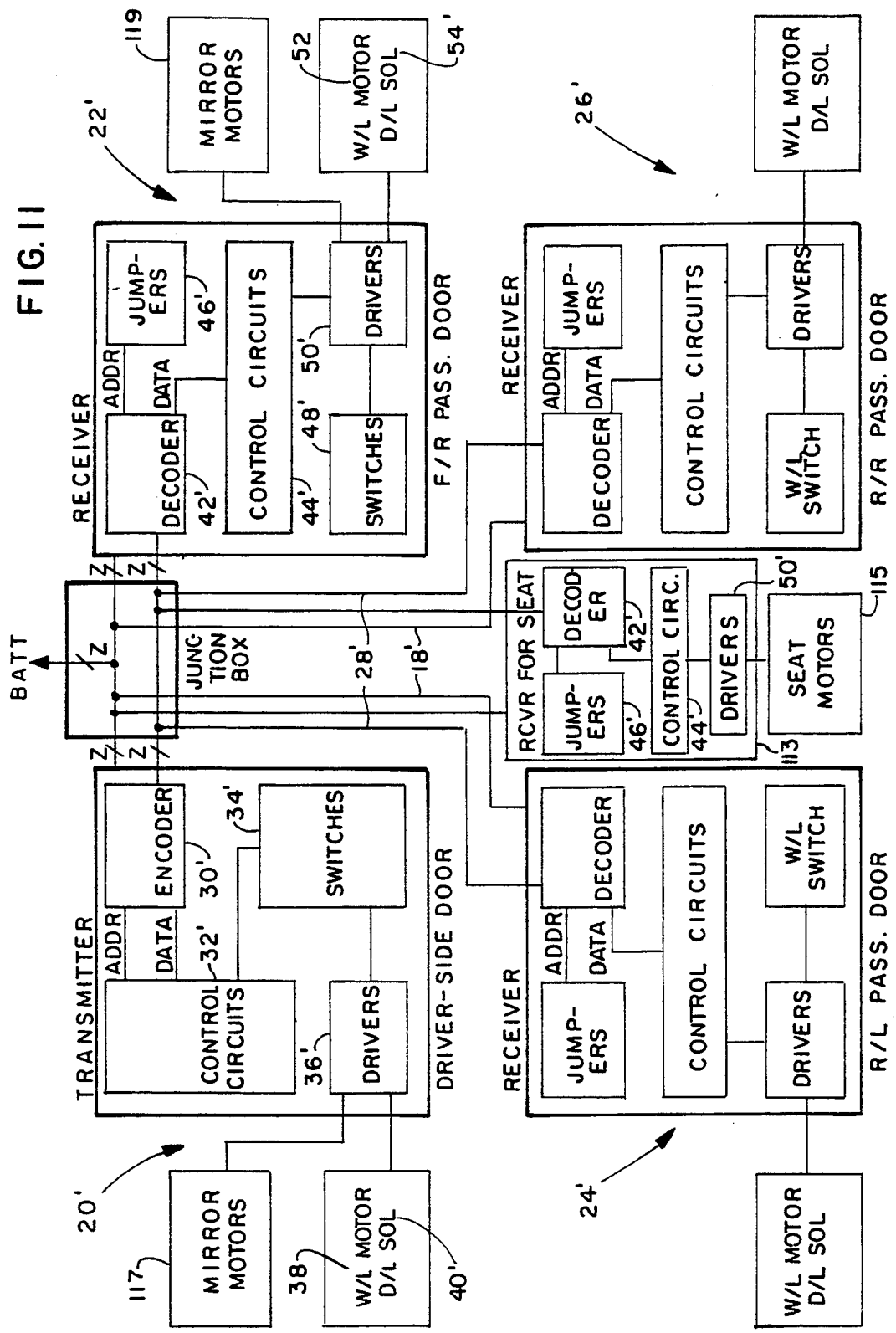
FIG. 11 is a simplified block diagram of the second embodiment of the invention, which includes a fifth receiving station for seat control.

A more detailed block diagram of the second embodiment, in FIG. 11, is similar to FIG. 2 and has in addition some mirrors 117 and 119, as well as the receiver 113 for operating the seat motors 115. Within the block 113 are a decoder 42', address jumpers 46', control circuits 44', and accessory drivers 50'. Their functions are the same as the functions of their above.

Figure 12:
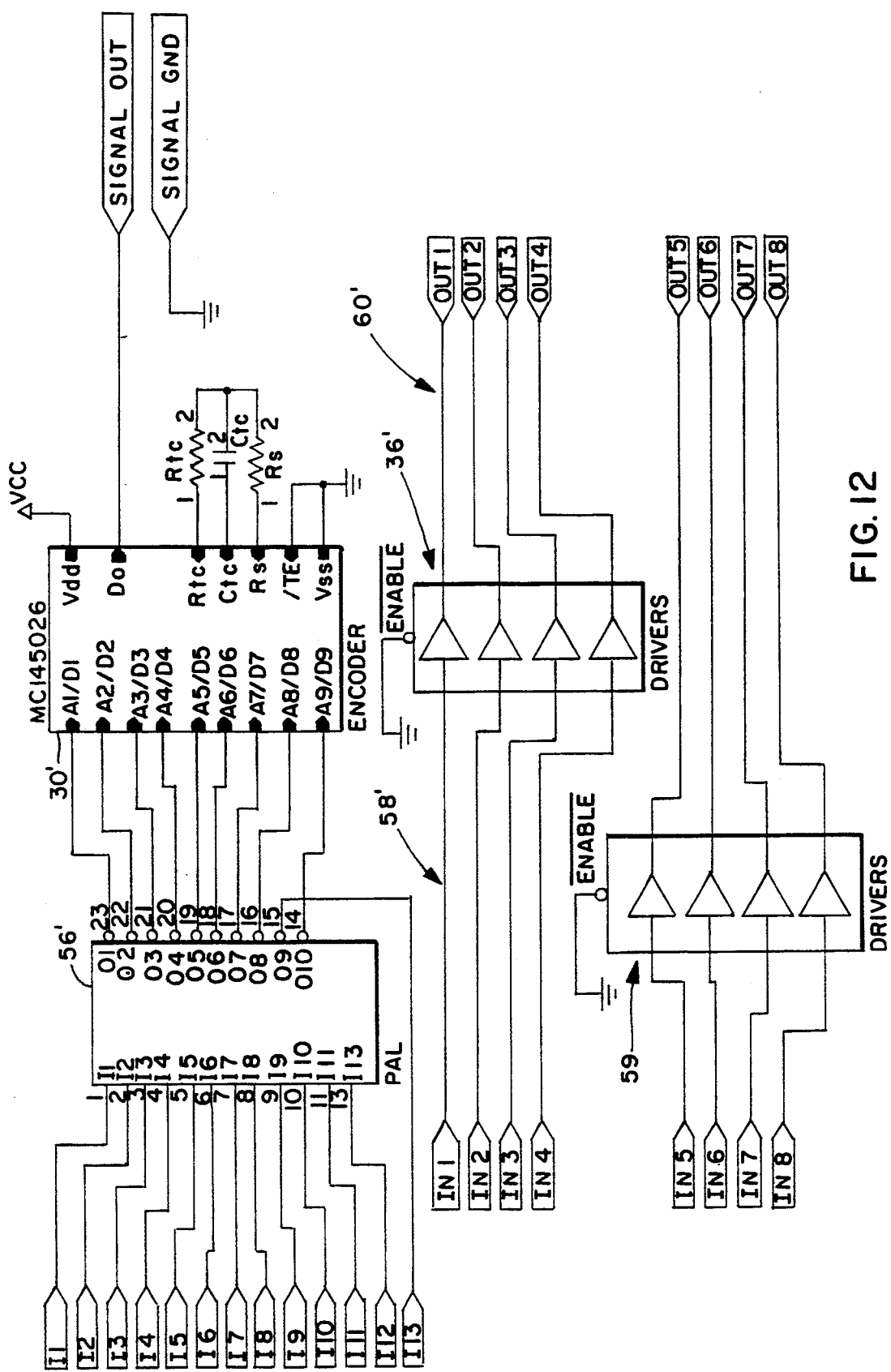
FIG. 12 is a block diagram of a transmitter in the transmitter station portion of the second embodiment.

The second-embodiment transmitter of FIG. 12 is very similar to the transmitter of FIG. 3, but it has additional drivers 59 for the additional accessories. The encoder 30' is a Motorola Model 145026 as and its inputs are provided by a programmable array logic (PAL) chip 56', which identifies the receiver station to which the information is to be sent, in accordance with the choice of manual switch that was actuated. Programming of the PAL 56' requires only ordinary skill in the programming art.

Figure 13:
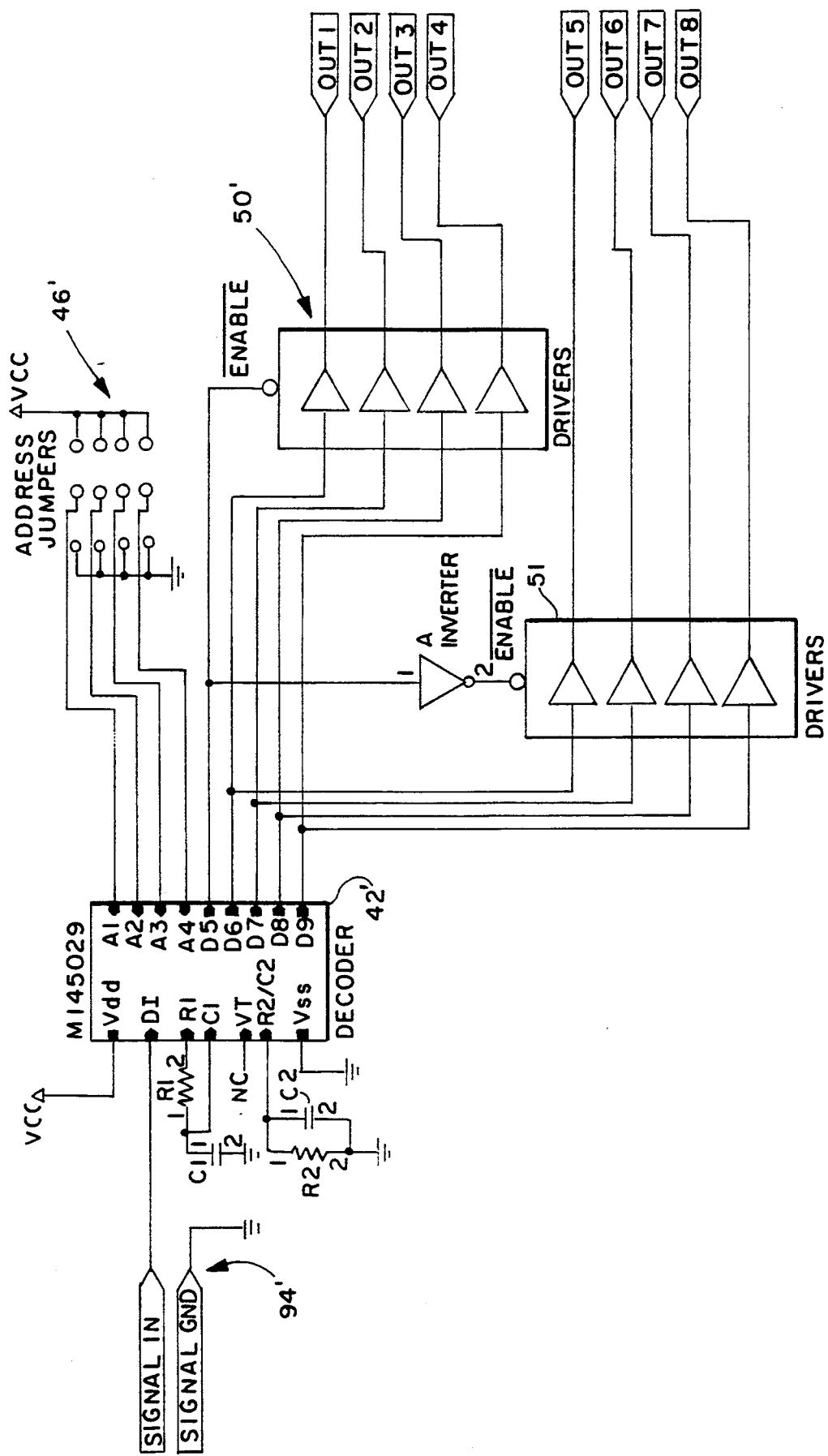
FIG. 13 is a block diagram of a portion of a receiver station of the second embodiment.

The receiver station of the second embodiment is shown in more detail in FIG. 13, which is similar to FIG. 8. Signals from the signal bus 28' enter at a header 94'. The decoder 42' is a Motorola Model MC145029. The station's address can be preset manually in a jumper array 46', and the address information is conveyed to the decoder 42' at a set A1–A4 of four terminals of the decoder. Another set D5–D9 of five terminals of decoder 42' have connections to drivers 50' and 51, which drive accessories.

Figure 14:
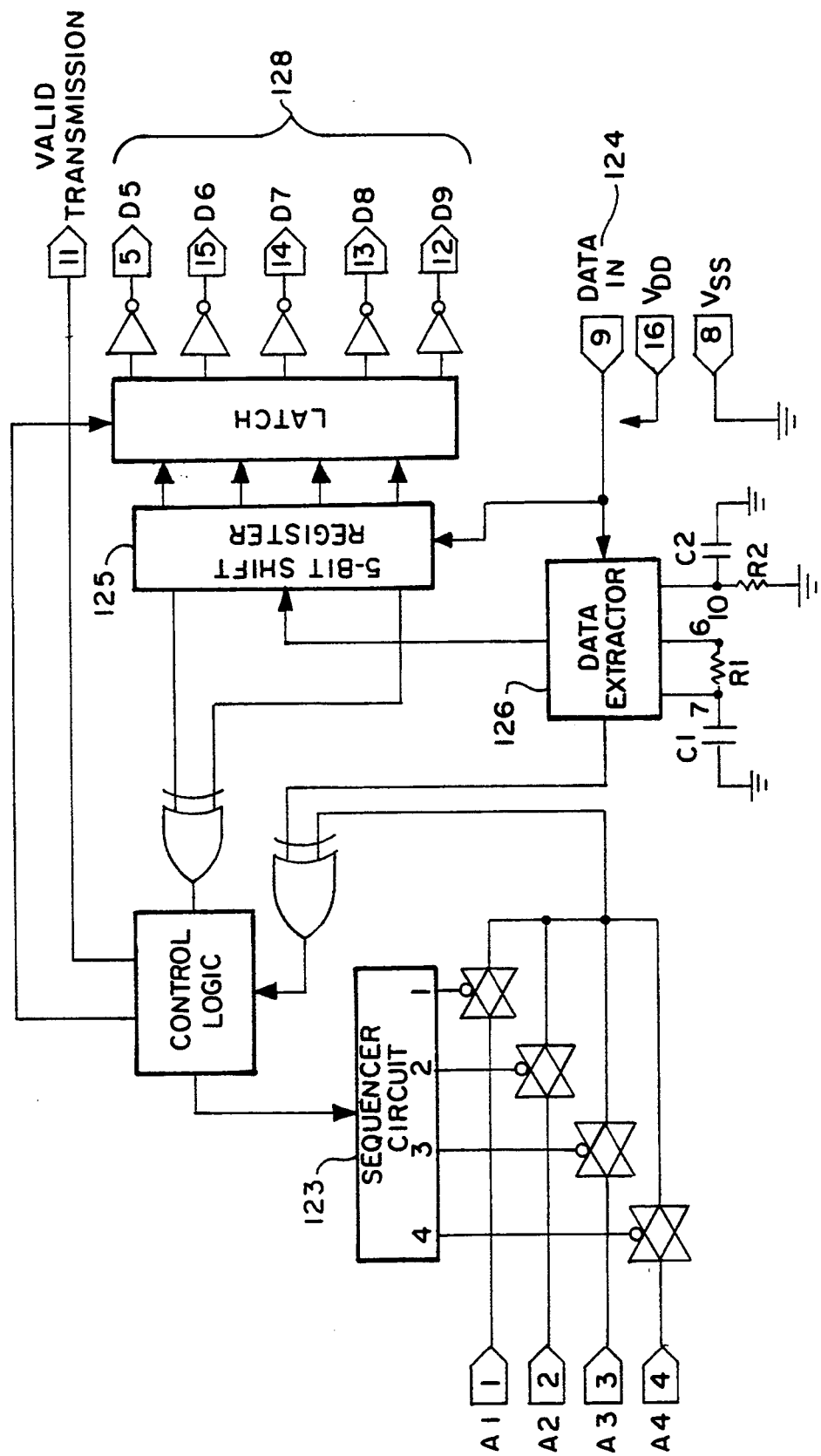
FIG. 14 is a block diagram of a type MC145029 decoder, for use in the second embodiment.

FIG. 14 shows the type MC145029 decoder as used in the second embodiment. It is similar to FIG. 9 except for having different numbers of stages in the sequencer circuit 123 and the shift register 125. Address information from the local jumpers enters the decoder at a terminal group A1–A4. Data come in at a terminal 124 from the signal bus 28', and are processed as before in a data extractor 126, as described for the first embodiment. Data output terminals are the terminal bank D5–D9.

In FIGS. 15A and 15B a control protocol MMP-959 is presented in chart form. It is used in this MMP-959 is presented in chart form. It is used in second embodiment for control of mirrors and a seat in addition to the previous accessories of windows and door locks.

The first column, designated 130, of FIG. 15A shows the code for transmitter address. Data in the second column, 132, are independent of transmitter address 130. In the third column, 134, each receiver in the vehicle is assigned a four-bit address. The fourth column, 136, describes in words the locations of the various receivers whose addresses are encoded in column 134.

In FIG. 15B, the first column, 138, states the locations of the five receivers of this second embodiment. Column 140 gives the address of each receiver location in coded format, as set forth previously in column 134 of FIG. 15A. Column 142 shows the data for specifying instructions, such as "seat recline", for the accessories that are controlled. Column 144 describes in words the action that corresponds to each of the data codes of column 142.

Upon occurrence of a "valid transmission" signal at a receiver station and the matching of address bits, a digital control circuit in the addressed station drives the accessory motors according to the functions specified in the MMP-959 protocol (FIGS. 15A and 15B).

FIGS. 4, 6, 7, 9, and 14 are adapted from Motorola Corporation catalog data sheets.

Although the invention has been explained by describing only a few embodiments, many other variations are possible. The scope of the invention is defined by the claims.

What is claimed is:

1. A multiaddress control system for one-way communication within a vehicle from a transmitter station to at least two receiver stations for remote control of power accessories, comprising:

an electrical power source in said vehicle for powering said power accessories;

a two-conductor power main system connected from said power source to each of said transmitter and receiver stations for powering said transmitter and receiver stations and their respective accessories;

a two-wire control communication bus for interconnecting said transmitter station with each of said receiver stations;

a plurality of switch means (34, 32) at said transmitter station for producing switch signals intended for controlling respective designated accessories at first and second ones of said at-least-two receiver stations;

an encoder at said transmitter station, for receiving said switch signals from said switch means and encoding said switch signals to provide signals for transmission via said communication bus to said first and second receiver stations, said encoder and said switch means being the only transmission apparatus at said transmitter station for remote control of said designated accessories;

a first decoder at said first receiver station for receiving said signals of said communication bus, said first decoder being the only receiving apparatus at said first receiver station for remote control by said transmitter of respective accessories at said first receiver station;

a second decoder at said second receiver station for simultaneously receiving said signals of said communication bus, said second decoder being the only receiving apparatus at said second receiver station for remote control by said transmitter of respective accessories at said second receiver station;

said encoder comprising means for encoding to provide said signals for transmission to said first and second receiver stations in the form of receiver-station addresses and designated-accessory commands, one receiver-station address and one designated-accessory command at a time, one of said decoders recognizing its address and executing the corresponding designated-accessory command;

communication means connecting said first and second decoders to corresponding power accessories at said first and second receiver stations respectively, for carrying signals from the decoders to the respective designated accessories for executing said corresponding designated-accessory commands;

said first and second decoders comprising means for utilizing power from said power main system to drive the designated accessory in response to said corresponding designated-accessory command;

said designated accessories comprising a first power window and first power door lock at said first receiver station and a second power window and second power door lock at said second receiver station, and said encoder and said first and second decoders operating in accordance with a protocol for remote control of said power windows and power door locks.

2. A multiaddress control system as in claim 1 and wherein:

said accessories further comprise at least one each of power mirrors and power seats, and said system further comprises a power-seat receiver station for said power seat, having a decoder and being electrically connected with said power source via said power main system and with said communication bus;

said switch means at said transmitter station further comprising a switch for controlling each of said power mirror and said power seat by providing mirror and seat switch signals, and said encoder at said transmitter station further comprising means for encoding said switch signals intended for controlling respective designated accessories at said power-seat receiving station;

communication means connecting said power-seat decoder to corresponding power accessories at said power-seat receiver station, for carrying signals from said power-seat decoder to respective designated accessories for executing said corresponding designated-accessory commands;

said power-seat decoder and said first and second decoders operating in accordance with a protocol for remote control also of said power mirror and power seat;

said power-seat decoder being the only receiving apparatus at said power-seat receiving station for receiving remote-control commands from said encoder.

3. A multiaddress control system in a vehicle for one-way-communication remote control of power-driven accessories at spaced-apart stations defined hereinbelow, comprising:

(a) an electrical power source on the vehicle for providing power to said spaced-apart stations and accessories;

(b) a common power main system connected to carry power from said electrical power source to said spaced-apart stations;

(c) a common two-wire signal bus connected to carry control signals to said spaced-apart stations;

(d) a transmitter station including transmitter-station manual switch means for initiating switch signals for controlling a plurality of accessories associated with receiver stations defined hereinbelow;

first control-circuit means (32) connected to receive said switch signals from said transmitter-station manual switch means and responsive thereto to issue corresponding signals;

encoder means receiving said corresponding signals issued from said first control-circuit means, for providing said control signals to said signal bus for transmission from said transmitter station to said receiver stations defined hereinbelow, each of said remote-control signals comprising an address signal and a command signal;

(e) a first receiver station including at least one first-receiver-station accessory;

first decoder means receiving said remote-control signals from said signal bus, for decoding said remote-control signals and providing respective first decoded signals;

a first means (46) connected with said first decoder means for assigning a predetermined address to said first decoder means to be responsive only to address signals and commands corresponding to said first decoder means;

said first decoder means and said first means for assigning an address being the only apparatus at said first receiver station for receiving said signals from said signal bus;

first remote-control-circuit means (44) connected for receiving said respective first decoded signals from said first decoder means and remotely controlling said first-receiver-station accessory;

at least one first-receiver-station manual switch for locally controlling said first-receiver-station accessory, at least one of said receiver-station accessories at said first receiver station being controllable by at least one of said transmitter-station manual switch means and also by a respective one of said first-receiver-station manual switch means;

(f) at least one additional receiver station including:

at least one additional-receiver-station accessory;

additional decoder means receiving said remote-control signals from said signal bus, for decoding said remote-control signals and providing respective additional decoded signals;

additional means connected with said additional decoder means for assigning a predetermined address to said additional decoder means to be responsive only to address signals and command signals corresponding to said additional decoder means;

said additional decoder means and said addition means for assigning an address being the only apparatus at said additional receiver station for receiving said remote-control signals from said signal bus;

additional remote-control-circuit means connected for receiving respective additional decoded signals from said additional decoder means and remotely controlling said additional-receiver-station accessory;

at least one additional manual switch for locally controlling said additional-receiver-station accessory, at least one of said receiver-station accessories at said additional receiver station being controllable by at least one of said transmitter-station manual switch means and also by a respective one of said additional manual switches at said additional receiver station.

* * * * *